US006947811B2

(12) United States Patent
Addink et al.

(10) Patent No.: US 6,947,811 B2
(45) Date of Patent: Sep. 20, 2005

(54) AUTOMATIC ADJUSTMENT OF IRRIGATION SCHEDULE ACCORDING TO CONDITION OF PLANTS

(76) Inventors: John Addink, 2900 Adams, Ste. A25, Riverside, CA (US) 92504; Sylvan Addink, 2900 Adams, Ste. A25, Riverside, CA (US) 92504

( * ) Notice: Subject to any disclaimer, the term of this patent is extended or adjusted under 35 U.S.C. 154(b) by 652 days.

(21) Appl. No.: 09/733,544

(22) Filed: Dec. 7, 2000

(65) Prior Publication Data

US 2002/0072829 A1 Jun. 13, 2002

(51) Int. Cl.[7] .................................................. G05D 7/00
(52) U.S. Cl. .................... 700/284; 700/16; 236/46 R
(58) Field of Search .................... 700/284, 296, 700/299, 306; 137/78.2, 78.3; 239/63, 64, 68, 69, 70, 99

(56) References Cited

U.S. PATENT DOCUMENTS

| | | | | | |
|---|---|---|---|---|---|
| RE31,023 E | * | 9/1982 | Hall, III | ...................... | 405/37 |
| 5,230,482 A | * | 7/1993 | Ratz et al. | ................. | 236/46 R |
| 5,251,153 A | * | 10/1993 | Nielsen et al. | .............. | 700/284 |
| 5,293,554 A | * | 3/1994 | Nicholson | .................... | 700/284 |
| 5,381,331 A | * | 1/1995 | Mock et al. | ................... | 700/16 |
| 5,444,611 A | * | 8/1995 | Woytowitz et al. | ........... | 700/16 |
| 5,479,338 A | * | 12/1995 | Ericksen et al. | .............. | 700/16 |
| 6,108,590 A | * | 8/2000 | Hergert | ...................... | 700/284 |
| 6,108,599 A | * | 8/2000 | Yamamoto et al. | ........... | 701/41 |
| 6,318,639 B1 | * | 11/2001 | Toth | .......................... | 236/46 R |
| 6,600,971 B1 | * | 7/2003 | Smith et al. | ................. | 700/284 |

* cited by examiner

Primary Examiner—Leo Picard
Assistant Examiner—Sheela Rao
(74) Attorney, Agent, or Firm—Rutan & Tucker, LLP

(57) ABSTRACT

The present invention provides systems and methods in which a microprocessor, disposed in an irrigation controller, is programmed to adjust an irrigation schedule according to a condition of a plant being irrigated. The adjustment to the irrigation schedule may be to the entire irrigated site or only to a portion of the irrigated site. The irrigation schedule may be at least partly derived from ETo data and may be from current ETo data, estimated ETo data or historical ETo data. The condition may be plant establishment, plant maturity or plant health.

10 Claims, 3 Drawing Sheets

AUTOMATIC ADJUSTMENT OF IRRIGATION SCHEDULE ACCORDING TO CONDITION OF PLANTS

FIELD OF THE INVENTION

The field of the invention is irrigation controllers.

BACKGROUND OF THE INVENTION

Many irrigation systems have been developed that automatically control the application of water to landscapes. These irrigation systems can range from simple systems that vary irrigation on a timed control basis to very complex systems that vary irrigation based on climatic and geographic conditions. This climatic and geographic data is received by or inputted into the irrigation controller, which then processes this data to control the distribution of water to the landscape in an efficient manner.

Regardless of complexity, there may be times when a change in the current irrigation schedule is required such as when the entire landscape or portions of the landscape are newly seeded, over seeded, sodded or when flowering and ornamental plants are newly installed. Additionally, in agriculture, horticulture and other crop production areas there is a need to vary the watering based on maturity of the crop. For example, with a newly seeded lawn, to optimize the germination and development of the new seeding requires that the newly seeded area be maintained in a moist condition for several weeks after seeding. Therefore, the irrigation system should be set to water frequently, and for only short periods of time so the soil is kept moist with little or no runoff occurring. As the grass plants develop, the frequency of watering should be decreased, which will result in the plants developing strong deep root systems. After the plants are well established the irrigation system should be set to irrigate the newly seeded area on the same irrigation schedule as a well-established lawn.

With known irrigation systems, to change the irrigation schedule for newly planted areas or for changes in water requirements as crops mature, requires manual inputs for each change made to the irrigation schedule. Frequently, these manual inputs are not made on a timely basis and the new plantings or crops will either be over-watered or under-watered.

What is needed is an irrigation controller that, after it is set to efficiently irrigate the newly planted area, will automatically vary the watering to optimize plant development until the plants or crops are well established, at which time the irrigation controller reverts to executing the regular irrigation schedule.

SUMMARY OF THE INVENTION

The present invention provides systems and methods in which a microprocessor, disposed in an irrigation controller, is programmed to adjust an irrigation schedule according to a condition of a plant being irrigated. The adjustment to the irrigation schedule may be to the entire irrigated site or only to a portion of the irrigated site.

The irrigation schedule is preferably at least partly derived from ETo data, and may be from current ETo data, estimated ETo data or historical ETo data.

The condition may be plant establishment, plant maturity or plant health.

Various objects, features, aspects, and advantages of the present invention will become more apparent from the following detailed description that describes a preferred embodiment of the invention, along with the accompanying drawings in which like numerals represent like components.

DETAILED DESCRIPTION

Figure 1:
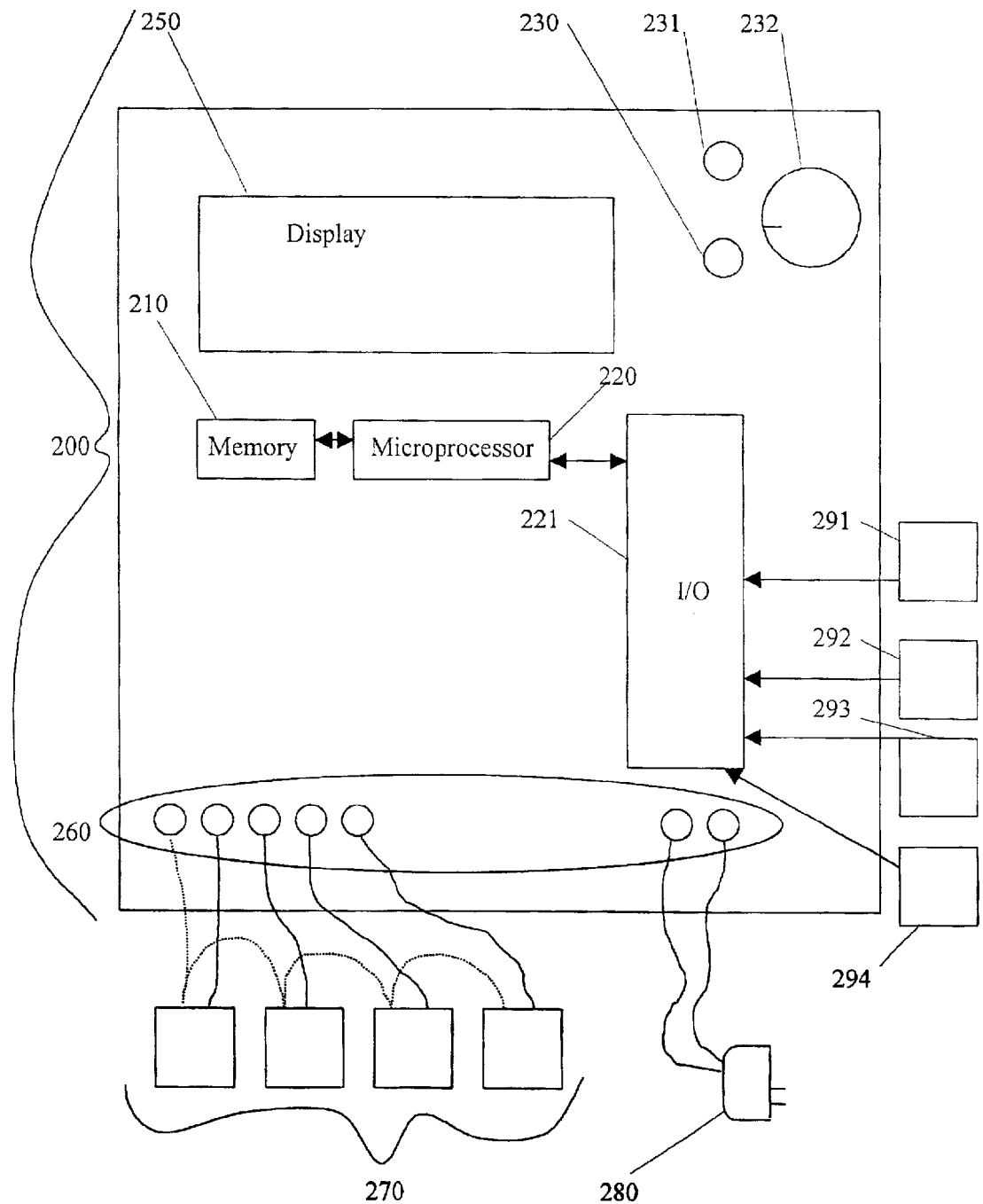
FIG. 1 is a schematic of an irrigation controller according to an aspect of the present invention.

In FIG. 1 an irrigation controller 200 generally includes a microprocessor 220, an on-board memory 210, manual input devices 230 through 232 (buttons and/or knobs), an input/output (I/O) circuitry 221 connected in a conventional manner, a display screen 250, electrical connectors 260 which are connected to a plurality of irrigation stations 270 and a power supply 280, a rain detection device 291, a flow sensor 292, a pressure sensor 293 and a temperature sensor 294. Each of these components by itself is well known in the electronic industry, with the exception of the programming of the microprocessor in accordance with the functionality set forth herein. There are hundreds of suitable chips that can be used for this purpose. At the present, experimental versions have been made using a generic Intel 80C54 chip, and it is contemplated that such a chip would be satisfactory for production models.

In a preferred embodiment of the present invention the controller has one or more common communication internal bus(es). The bus can use a common or custom protocol to communicate between devices. There are several suitable communication protocols, which can be used for this purpose. At present, experimental versions have been made using an I²C serial data communication, and it is contemplated that this communication method would be satisfactory for production models. This bus is used for internal data transfer to and from the EEPROM memory, and is used for communication with peripheral devices and measurement equipment including but not limited to water flow sensors, water pressure sensors, and temperature sensors.

Figure 2:
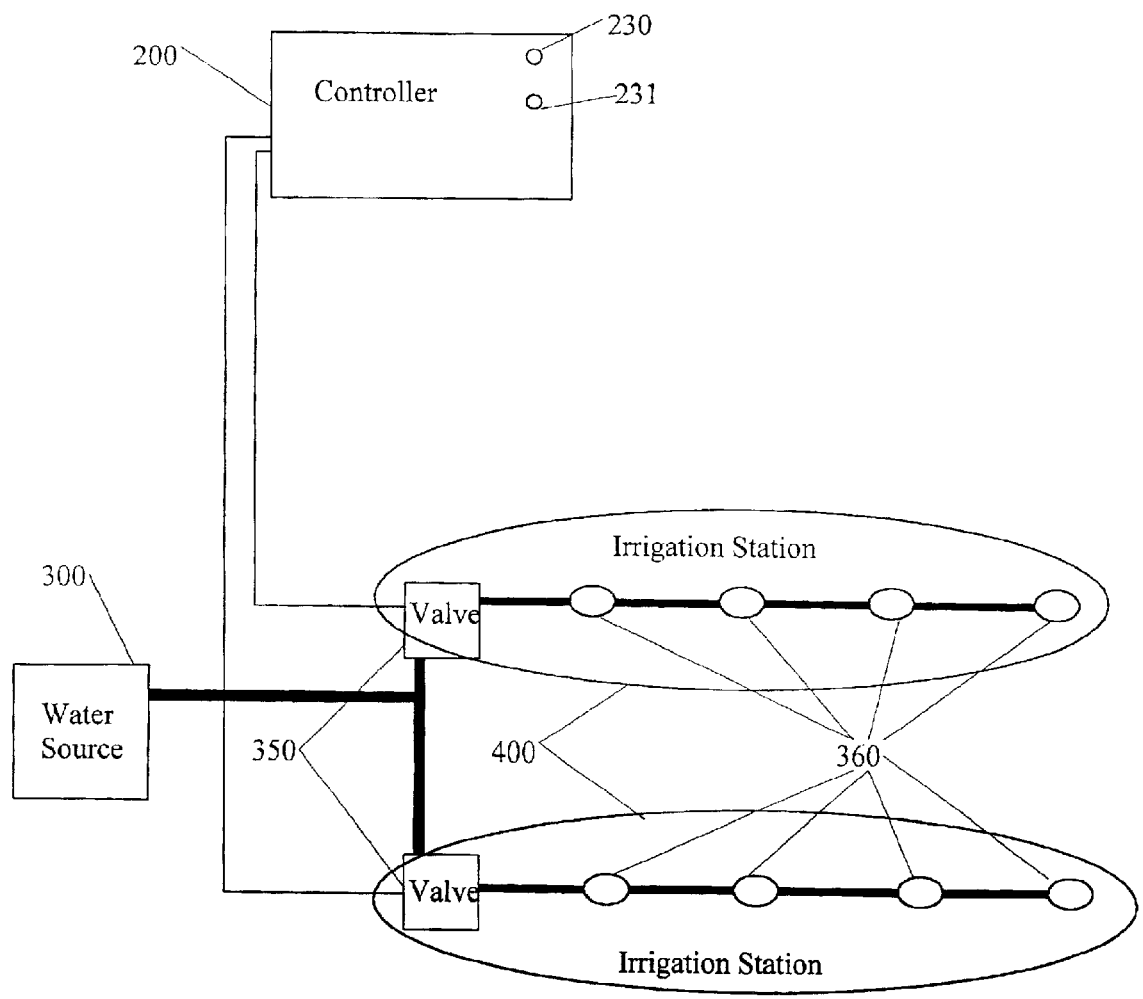
FIG. 2 is a block diagram of an irrigation system according to an aspect of the present invention.

In FIG. 2 a single irrigation controller 200 operates two irrigation stations 400. It will be understood that these stations 400 are indicative of any two or more irrigation stations, and are not to be interpreted as limiting the number or configuration of irrigation stations. It is contemplated that the irrigation stations may be part of an underground installed irrigation system, such as those used on residential sites, commercial sites, golf courses, public parks, and so forth. Additionally the irrigation stations may be part of center pivot systems, wheel type systems, solid set systems, or any other irrigation system used in the irrigating of plants. Structure and operation of the irrigation controller is preferably as described elsewhere herein except as to the adjustment of the irrigation schedule according to the condition of the plants being irrigated. Among other things, the irrigation controller 200 operates solenoids (not shown) that open the station valves 350 to allow irrigation water from the water source 300 to be distributed to the various irrigation stations 400 and thereby irrigate the landscape through one or more (four are shown for each irrigation station but it may be any number) irrigation sprinkler heads 360.

It is contemplated that when the irrigation controller is initially installed, an irrigation schedule is programmed into the controller, and is stored in the memory. For example, if the irrigated site is a lawn, the initially installed irrigation schedule may be set so that each station will apply 0.19 inches of water each day or the water required to maintain the plants in a healthy condition during the summer. Preferably, if no adjustment to the irrigation schedule is needed to satisfy a condition of the plants being irrigated, the initial irrigation schedule will be modified during the year to provide irrigation of the lawn that meets the water requirements of the grass with a minimum waste of water (See Schedule A, FIG. 3). Schedule A is preferably at least partly derived from ETo (pontential (i.e, estimated evapotranspiration) data that will generally result in the irrigation applications closely approximating the water needs of the plants with a minimum waste of water. Evapotranspiration is the water lost by direct evaporation from the soil and plant and by transpiration from the plant surface. ETo can be calculated from meteorological data collected on-site, or from a similar site. ETo data from meteorological monitoring equipment located on the irrigation site is thought to provide the most efficient irrigating of the landscape, however, monitoring equipment required to obtain the ETo values is very expensive to install and operate. Therefore, most of the data for ETo calculations is gathered from off-site locations that are frequently operated by government agencies. The ETo data may be obtained from a number of sources, including government managed weather stations such as CIMIS (California Irrigation Management Information System, maintained by the California Department of Water Resources), CoAgMet maintained by Colorado State University-Atmospheric Sciences, AZMET maintained by University of Arizonia—Soils, Water and Environmental Science Department, New Mexico State University—Agronomy and Horticulture, and Texas A&M University—Agricultural Engineering Department. Although slight variations in the methods used to determine the ETo values do exist, most ETo calculations utilize the following environmental factors: temperature, solar radiation, wind speed and humidity. The ETo value used may advantageously comprise current ETo (i.e., within the last week, three days, or most preferably within the last 24 hours), an estimated ETo value based upon a regression model using one or more of the factors used in calculating ETo (as for example that described in pending U.S. patent application Ser. No. PCT/US00/18705), or an historical ETo value (as for example that described in pending U.S. patent application Ser. No. PCT/US00/40685).

There will be times when Schedule A will have to be modified, such as when an area of the landscape is newly planted, a crop matures or when the health of a plant requires an increase or decrease in watering. In the above example of a lawn, if the lawn was newly seeded, the new seeding requires frequent light irrigations to maintain the soil in a moist condition to enhance the germination and development of the new grass seedlings. If only a portion of the lawn area is newly seeded then only that portion of the irrigated lawn will require an adjustment in the irrigation schedule or Schedule A. The new irrigation schedule or Schedule B is preferably preprogrammed in the microprocessor and the pressing of one or two buttons 230 and/or 231, FIG. 2 would be required to initiate the execution of Schedule B. Alternatively, Schedule A may be manually changed to initiate the start of Schedule B and then the microprocessor would automatically make any adjustments to Schedule B during subsequent periods of time.

Schedule B will vary based on the condition of the plants, plant species, soils, topography, and so forth. In the above example with the newly seeded lawn, the early phase of Schedule B will advantageously involve frequent light irrigations to keep the lawn area moist until the plants are established. In a preferred embodiment of the present invention, when the grass is established, the microprocessor will automatically reduce the irrigation frequencies or apply less water, which will result in the plants developing a strong, deep root system. It is contemplated that when the plants are well established, the irrigation controller will again execute Schedule A.

Figure 3:
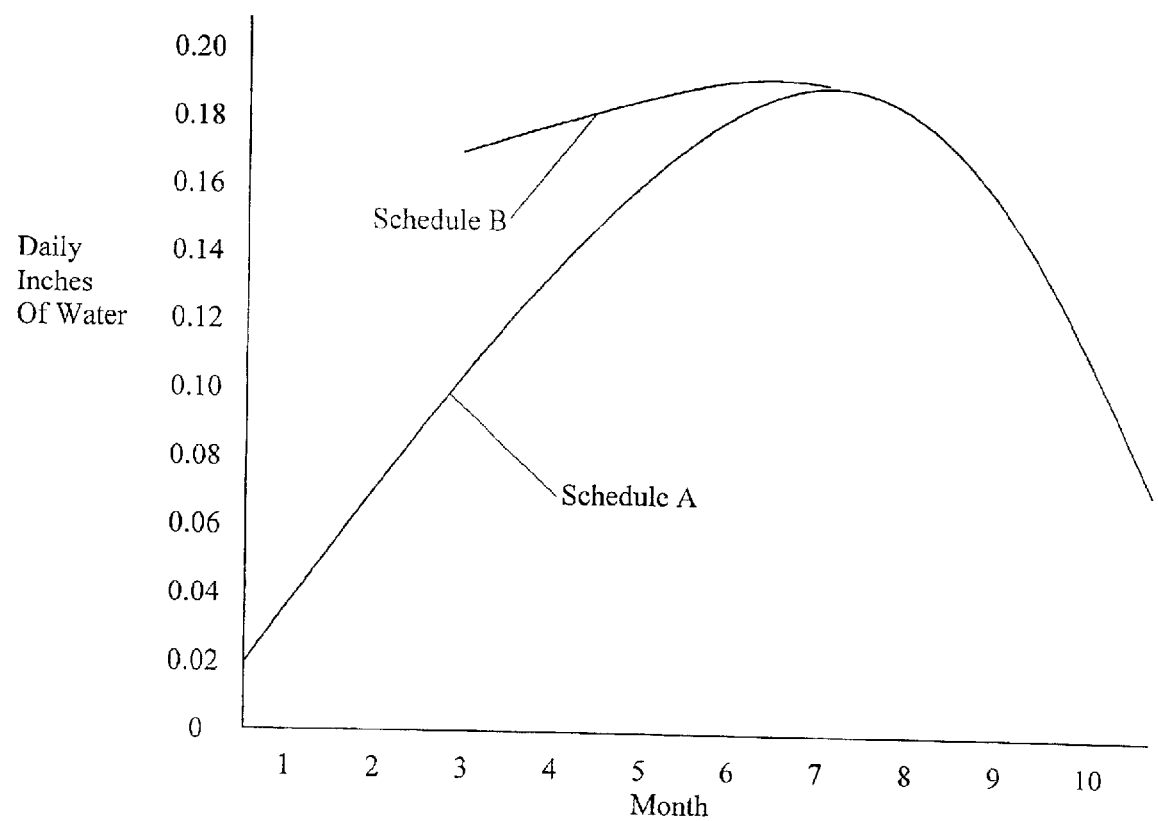
FIG. 3 is a graphical representation of adjustment of an irrigation schedule according to a condition of a plant being irrigated.

In the above example with the newly seeded lawn, the irrigation controller will execute Schedule B for an adequate period of time to allow the plants to become established. Preferably the period of time would be for three to five months but it could be for a period of time less than or more than this. FIG. 3 shows an example of a lawn that was seeded on approximately March 1 and by July 1 Schedule B and Schedule A are similar. Schedule A will automatically be executed from then on. The period of time Schedule B will be executed will vary based on the plant species, planting date, soils, and so forth.

Schedule B may not always be executed entirely independent of the parameters that Schedule A was derived from such as ETo. With some plant conditions, such as crop maturity, both the maturity of the plants and an ETo value may be used to derive Schedule B.

The plants include all landscape plants, such as grasses, including either seed or sod, flowers, shrubs, etc., agricultural crops, horticultural crops and any other crops to which irrigated water is applied.

Thus, specific embodiments and applications of methods and apparatus of the present invention have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An irrigation controller comprising a microprocessor programmed to:

execute an initial irrigation schedule;

adjust the initial irrigation schedule to execute a temporary irrigation schedule that waters a non-zero amount according to a condition of a plant being irrigated;

automatically vary the temporary irrigation schedule to meet the watering requirements of the plant being irrigated; and thereafter to automatically revert back to the initial irrigation schedule.

2. The irrigation controller of claim 1, wherein the adjustments to the initial irrigation schedule is to the entire irrigated site.

3. The irrigation controller of claim 1, wherein the adjustments to the initial irrigation schedule are only to a portion of the irrigated site.

4. The irrigation controller of claim 1, wherein the initial irrigation schedule is at least partly derived from ETo data.

5. The irrigation controller of claim 4, wherein the ETo data is current ETo data.

6. The irrigation controller of claim 4, wherein the ETo data is estimated ETo data.

7. The irrigation controller of claim 4, wherein the ETo data is historical ETo data.

8. The irrigation controller of claim 1, wherein the condition is plant establishment.

9. The irrigation controller of claim 1, wherein the condition is plant maturity.

10. The irrigation controller of claim 1, wherein the condition is plant health.

* * * * *